United States Patent [19]

Fay

[11] Patent Number: 5,037,147

[45] Date of Patent: Aug. 6, 1991

[54] LATCHING MECHANISM FOR CHAMBER ACCESS DOOR

[75] Inventor: John M. Fay, Warminster, Pa.

[73] Assignee: Hull Corporation, Hatboro, Pa.

[21] Appl. No.: 506,321

[22] Filed: Apr. 6, 1990

[51] Int. Cl.$^5$ .............................................. E05C 1/02
[52] U.S. Cl. .................................... 292/342; 220/324;
292/144; 292/150; 292/157; 292/33
[58] Field of Search ............... 292/150, 144, 157, 302,
292/162, 156, 256.6, 256.63, 160, 260, 342,
256.65, 33; 220/324

[56] References Cited

U.S. PATENT DOCUMENTS

| | | | |
|---|---|---|---|
| 1,874,833 | 8/1932 | Taylor | 292/33 X |
| 2,718,239 | 9/1955 | Erbguth | 292/144 X |
| 2,926,012 | 2/1960 | Maher | 292/300 X |
| 3,166,144 | 1/1965 | Price | 292/144 X |
| 3,311,255 | 3/1967 | Loveless | 220/324 |
| 4,347,944 | 9/1982 | Moldrup | 292/256.65 X |
| 4,883,637 | 11/1989 | McDaniels, Jr. | 292/256.67 X |

Primary Examiner—Richard E. Moore
Attorney, Agent, or Firm—Olson & Olson

[57] ABSTRACT

The access door of a chamber housing opening is secured releasably in closed position by a latching mechanism provided on each of the four edges of the door. Each latching mechanism includes a plurality of spaced apart wedges projecting outwardly from the edge of the door for releasable registry with a plurality of spaced apart wedges on a wedge member mounted on the chamber housing for movement by an hydraulic cylinder between a door opening position in which the wedges on the door register with spaces between the wedges on the wedge member, and a door latching position in which the wedges on the wedge member are moved by the hydraulic cylinder into sliding, wedging engagement with the wedges on the door, whereby to draw the door into sealing engagement with the chamber housing adjacent the periphery of the opening in the housing. An O-ring seal disposed about the periphery of the door is arranged to engage the chamber housing upon closure of the door, to seal the chamber for evacuation or pressurization. Locking mechanism includes an air cylinder having a piston rod movable into registering openings in brackets mounted on the door and chamber housing when the door is latched in closed position, to secure the closed position against inadvertent release.

7 Claims, 3 Drawing Sheets

LATCHING MECHANISM FOR CHAMBER ACCESS DOOR

BACKGROUND OF THE INVENTION

This invention relates to processing chambers, and more particularly to mechanism for releasably latching and sealing the access door of a lyophilizer or other processing chamber housing which operates at sub-atmospheric or super atmospheric pressures.

Lyophilizers, commonly called freeze dryers, like many other industrial chambers require an access door that is capable of being releasably latched and sealed in closed condition in order for the chamber to be evacuated or pressurized.

Some conventionally employed latching mechanisms for such access doors require hardware that covers so much of the outside surface of the door that it is not possible to include in the door such desirable accessories as vision ports, sampling sub-chambers attached to such vision ports, which allow extraction of individual product vials without interrupting the production cycle, and sub-doors which are small doors within the main door for use in loading and unloading the interior shelves without requiring opening of the main door which promotes drastic intrusion.

An example of such conventional latching mechanisms is the arrangement of a plurality of radially extending spider arms movable outwardly into associated sockets by a central handwheel.

Other chamber access doors are secured releasably by a multiplicity of hinged latch bolts which are mounted on the chamber and are movable manually into notches in the periphery of the door and then rotated to press the door against a seal between the door and chamber. This type of latch mechanism requires considerable manual labor and time to open and close.

Still other chamber access doors are provided with a plurality of air cylinders which drive locking pins outwardly from the door into apertures in the chamber wall. An inflatable seal between the chamber wall and door serves to allow evacuation or pressurization of the chamber. Inadvertent deflation of the seal results in loss of vacuum or pressure in the chamber, with consequent destruction of the contents.

SUMMARY OF THE INVENTION

The latching mechanism of this invention broadly includes a pair of latching wedge members one mounted on the perimeter of the chamber door and the other mounted on the chamber housing. One of the pair of latching wedge members is movable for releasable engagement with the other wedge member to draw the door toward and into latching engagement with the housing, and a sealing member is mounted on the door or housing to form a vacuum or pressure seal between the door and housing when the door is latched to the housing.

It is the principal objective of this invention to provide a chamber door with latching mechanism of the class described which overcomes the aforementioned disadvantages and limitations of prior access door latching mechanisms.

Another objective of this invention is the provision of a chamber door with latching mechanism of the class described which enables the use of a standard O-ring for sealing the periphery of the door.

Still another objective of this invention is to provide a chamber door with latching mechanism of the class described which is adaptable for operation from a remote position.

A further objective of this invention is the provision of a chamber door with latching mechanism of the class described which is adaptable for programmed opening and closing operations.

A still further objective of this invention is the provision of a chamber door with latching mechanism of the class described which may incorporate locking mechanism to insure against inadvertent unlatching of the door.

The foregoing and other objects and advantages of this invention will appear from the following detailed description, taken in connection with the accompanying drawings of a preferred embodiment.

DESCRIPTION OF THE PREFERRED EMBODIMENT

Figures 1, 2:
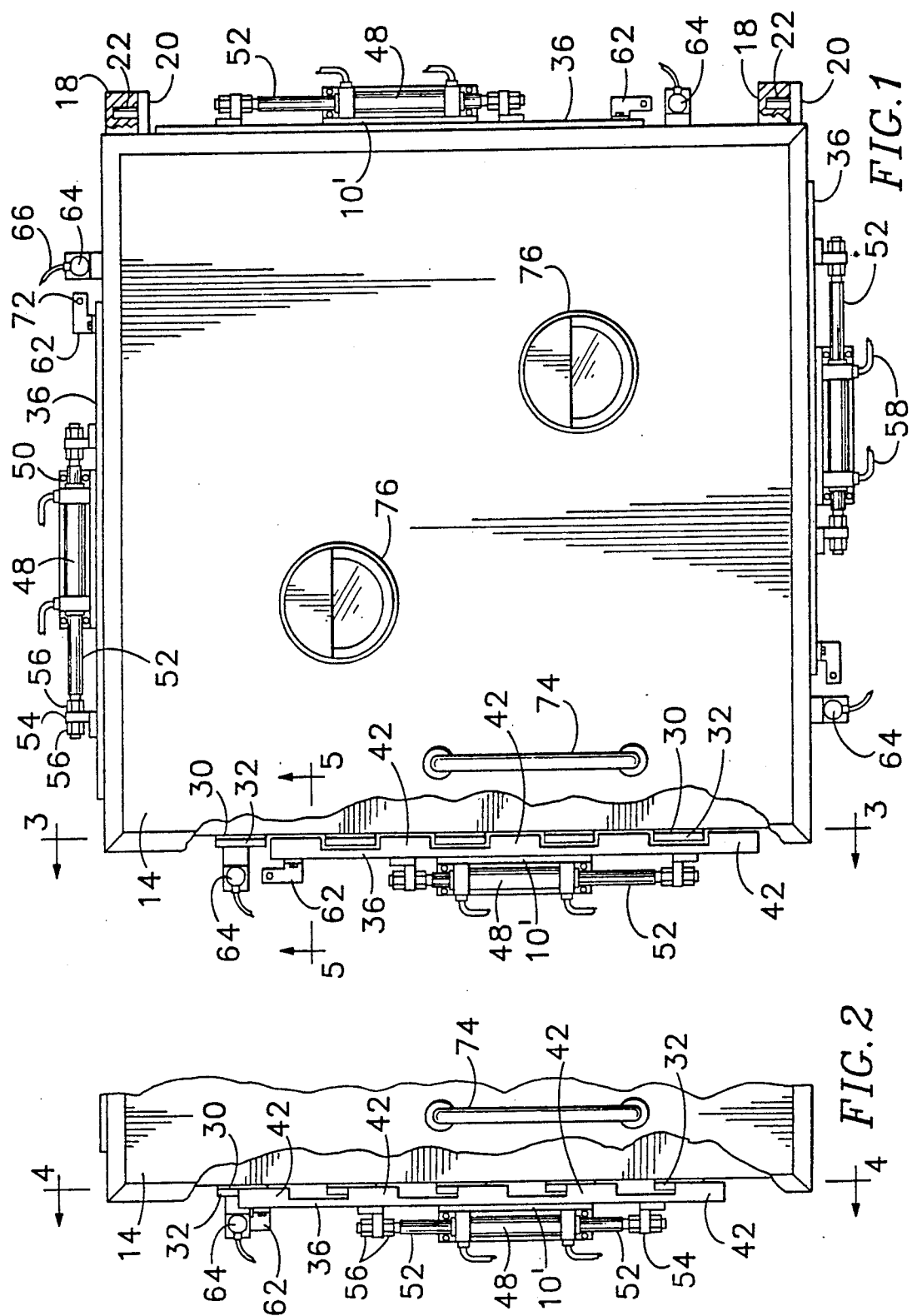
FIG. 1 is a front elevational view of a lyophilizing chamber the access door of which is provided with latching mechanism embodying the features of this invention, the latching mechanism being shown in door-unlatching position.
FIG. 2 is a fragmentary front elevation similar to FIG. 1 showing the latching mechanism in door-latching position.
Figure 3:
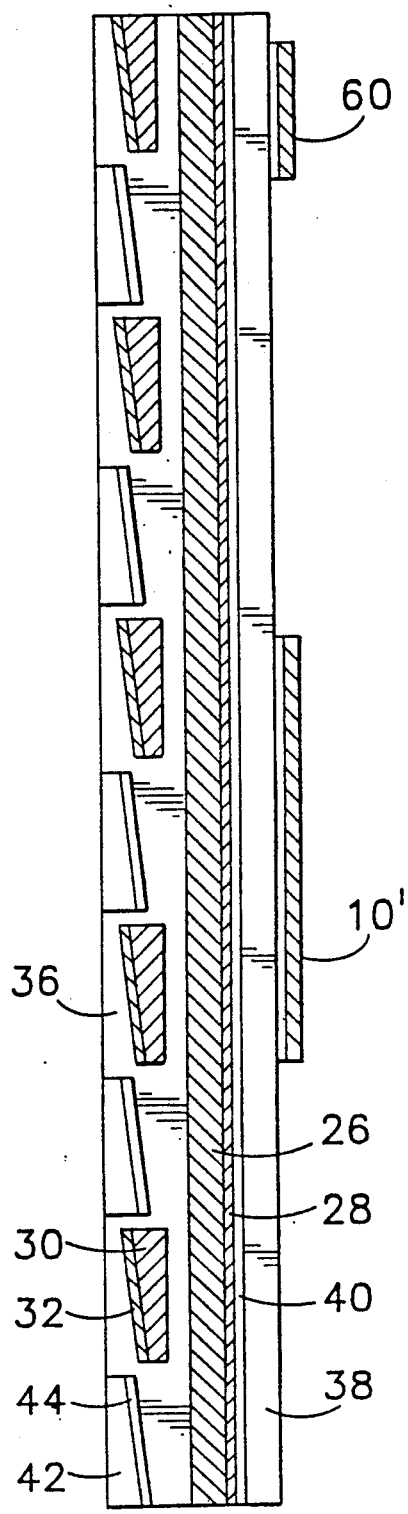
FIG. 3 is a sectional view taken on the line 3—3 in FIG. 1 showing the latching wedges in door-unlatching position.
Figure 4:
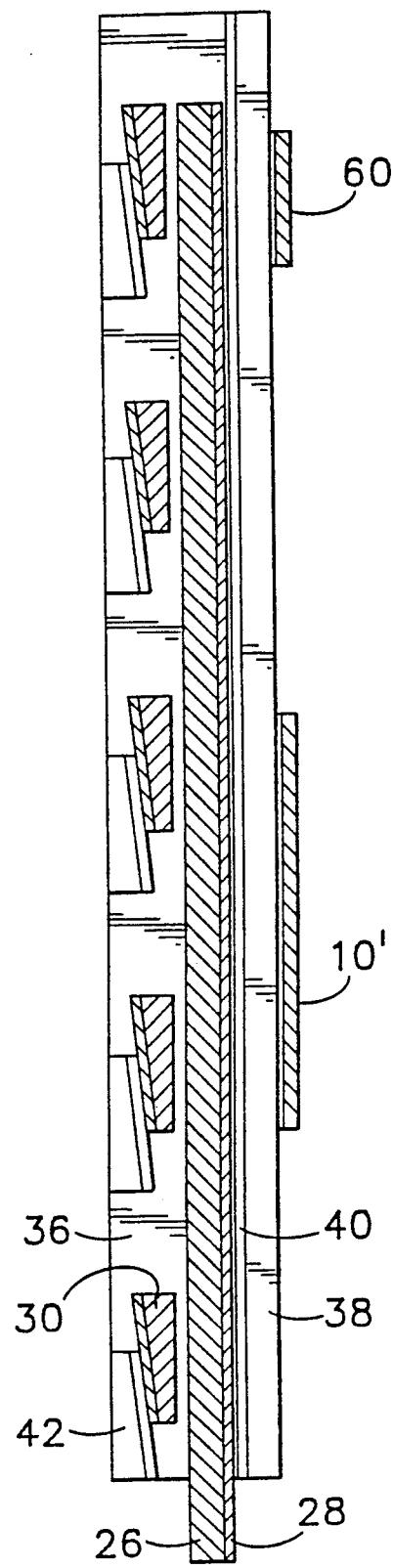
FIG. 4 is a sectional view taken on the line 4—4 in FIG. 2 showing the latching wedges in door-latching position.
Figure 5:
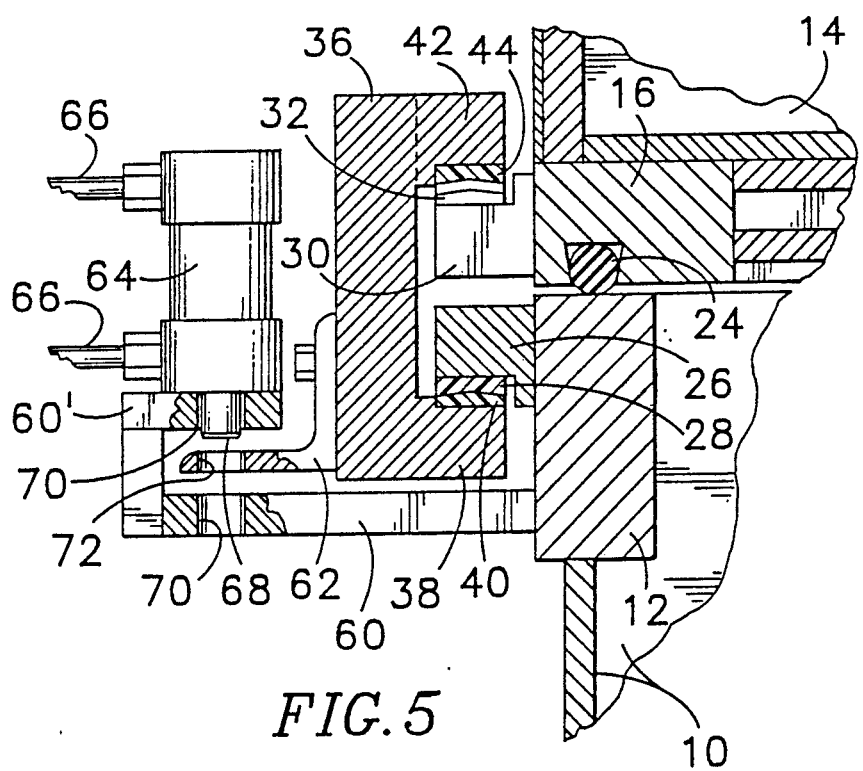
FIG. 5 is a fragmentary sectional view taken on the line 5—5 in FIG. 1 showing locking mechanism for securing the latching mechanism against inadvertent release.

For the purpose of the following description, the drawings show a lyophilizing chamber which includes a housing 10 provided on its front side with a peripheral flange 12 which defines the access opening of the housing. An access door 14 also is provided with a peripheral flange 16 for cooperative registration with the flange 12. The door is mounted on the housing by means of hinge members 18 secured to the peripheral flange of the access door. Cooperating hinge members 20 are secured to the housing wall flange 12 and are provided with vertically extending pivot pins 22 which are received in vertically extending sockets in the hinge members 18.

An O-ring seal 24 is mounted in a peripheral groove in the surface of the access door flange 16 facing the flange 12 of the housing, and functions to provide an air tight seal between the flange members when the access door is closed.

An elongated track member 26 is secured, as by welding, to the outer surface of each of the housing flange members 12 defining the four sides of the housing. A strip 28 of material having a low coefficient of friction, is secured to the rearward face of the track member 26.

A plurality of spaced apart wedges 30 are secured, as by welding, to the outwardly facing surface of each of the four door flange members 16 defining the four sides of the door. Each of these wedges is provided on its forwardly facing surface with a strip 32 of low friction material such as strip 28. The plurality of wedges 30 are provided with spaces 34 between them.

A C-shaped wedge member 36 is provided with an elongated rear track leg 38 provided on its rear inside surface with a strip 40 of the low friction material similar to the strips 28 and 32. This strip 40 is arranged for sliding engagement with the low friction strip 28.

The C-shaped wedge member 36 also is provided with a plurality of spaced apart wedges 42 which form the front leg of the C-shaped wedge member. Each of these wedges 42 is provided with a strip 44 of low friction material on the rearwardly facing inside surface, for sliding engagement with the low friction strips 32 on the spaced apart wedges 30. It is to be noted that the spaces 46 between the spaced apart wedges 42 are slightly wider than the width of each of the associated wedges 30 on the door flange 16. The purpose of this dimensional relationship is described hereinafter.

In the preferred embodiment illustrated, the low friction strips 32 and 40 are provided with sliding surfaces which are angularly convex and the facing surfaces of the strips 28 and 44 are angularly concave. This arrangement stabilizes the sliding assembly against lateral displacement.

A fluid pressure cylinder 48, preferably hydraulic, is secured to a support bracket 10' attached to the flange 12 of the chamber housing 10 adjacent each side of the door 14, as by means of attaching screws 50. A piston rod 52 extends outwardly from both ends of the cylinder 48, and these ends are secured to the C-shaped wedge member 36 by means of the connecting brackets 54 and securing nuts 56. Fluid lines 58 communicate the opposite ends of the cylinder 48 with a source of hydraulic or other fluid pressure for operating the cylinder in the well known manner of reciprocating the piston rod longitudinally relative to the longitudinal axis of the cylinder.

A J-shaped locking bracket is secured at the free end of its long leg 60 to the chamber housing flange 12. The free end of the short leg 60' of the J-shaped locking bracket faces the closed side of the C-shaped wedge member 36. Interposed between the free end of the short leg of the J-shaped locking bracket and the C-shaped wedge member is an angle iron locking bracket 62. One leg of the angle iron is secured to the C-shaped wedge member 36 and the other leg of the angle iron extends freely into the space between the long and short legs 60 and 60', respectively, of the J-shaped locking bracket.

A fluid pressure cylinder 64, preferably pneumatic, is secured to the forwardly facing surface of the short leg 60' of the J-shaped locking bracket and is provided with a pair of supply lines 66 for connection to a suitable source of fluid pressure by which to operate the air cylinder and reciprocate the piston rod 68 longitudinally relative to the longitudinal axis of the air cylinder. Registering openings 70 in the long and short legs of the J-shaped locking bracket, for the retractable reception of the piston rod 68. An opening 72 in the leg of the angle iron locking bracket 62 interposed between the legs of the J-shaped locking bracket is arranged for registration with the openings 70 when the access door 14 is in the closed position and the C-shaped wedge member 36 is moved to the latched position. Accordingly, the piston rod 68 may be extended through the aligned openings 70 and 72 to lock the C-shaped wedge member 36 and hence the door in latched position against inadvertent release of the latching wedges 30 and 42.

A handle 74 is provided on the door 14 adjacent the side opposite the door hinge members 18, to facilitate opening the door.

In describing the operation of the latching and locking mechanism, let it be assumed that the door is open and it is desired to close the door and latch it in sealed condition for evacuation or pressurization of the housing chamber. Accordingly, the door is swung on its hinge members 18, either by manual pressure or by power means controlled manually or by a sequence program. For this purpose the C-shaped wedge member 36 is moved by the cylinder 48 to position the spaces 46 between wedges 42 in registry with the spaced apart wedges 30 on the door. The door thus may be moved to closed position by virtue of the wedges 30 passing through the spaces 46.

The hydraulic cylinder 48 then is operated to move the C-shaped wedge member 36 in the direction to move the wedges 42 along the wedges 30. This movement is facilitated by the mutual sliding engagement of the low friction strips 28, 40 and 32, 44. The door 14 thus is pushed toward the housing, bringing the 0-ring seal 24 into resilient, sealing contact with the confronting front surface of the housing flange 12.

To secure the door in said closed and sealed condition against inadvertent release of the latching wedges, the air cylinder 64 is operated to extend the piston rod 68 through the now aligned openings 70 and 72. The housing chamber now may be evacuated or pressurized, as desired.

Opening of the access door 14 follows a substantial reversal of the operational steps described hereinbefore, as will be understood.

It is to be noted that the latching and locking mechanisms of this invention are located on the periphery of the door, leaving the front surface thereof unencumbered and available for mounting such desirable accessories as vision ports 76, sampling sub-chambers and/or a sub-door, mentioned hereinbefore.

It will be understood that the fluid pressure cylinders 48 and 64 may be provided with controls for operation either manually at a remote location or automatically on a programmed time sequence.

It will also be apparent to those skilled in the art that various other modifications and changes may be made in the size, shape, type, number and arrangement of parts described hereinbefore, without departing from the spirit of this invention and the scope of the appended claims.

I claim:

1. In combination with a chamber housing having an access opening in a wall thereof and an access door mounted movably on the chamber for releasably closing said access opening, latching mechanism comprising:
    (a) a plurality of spaced apart wedge members mounted on and extending outwardly from a peripheral edge of the door,
    (b) a plurality of spaced apart wedge members mounted on the chamber housing in a position adjacent the wedge members on the door when the door is in closed position,
    (c) the spacing between the wedge members on the housing being greater than the width of the associated wedge members on the door, (d) the wedge members mounted on the housing or door being movable relative to said housing or door upon which said wedge members are mounted, and (e) drive means engaging the said movable wedge members on said housing or door for moving said movable wedge members simultaneously relative to the housing or door upon which they are mounted between a door opening position in which the wedge members on the door register with the spaces between the wedge members on the housing, and a door latching position in which the wedge members engaging the drive means are moved into wedging engagement with the other wedge members to move the door to latched position.

2. The combination of claim 1 wherein the drive means comprises a fluid pressure cylinder.

3. The combination of claim 1 wherein the movable wedge members are mounted on the housing and the drive means comprises a fluid pressure cylinder mounted on the housing and having a reciprocative piston rod connected to the wedge members on the housing.

4. The combination of claim 1 including locking means releasably interengaging the chamber housing and door in the closed position of the door.

5. The combination of claim 4 wherein the locking means includes a fluid pressure cylinder having a piston rod movable between a locking position extending through registering openings in brackets secured to the chamber housing and door, respectively, and an unlocking position retracted from said bracket openings.

6. The combination of claim 1 including a wedge support member mounted movably on the chamber housing and supporting the plurality of spaced apart wedges for simultaneous movement therewith, and means interengaging the drive means and wedge support member for moving the latter.

7. The combination of claim 6 wherein the drive means comprises a fluid pressure cylinder mounted on the housing and having a reciprocative piston rod connected to the wedge support member on the housing.

* * * * *